(12) United States Patent
Masarati et al.

(10) Patent No.: US 8,309,659 B2
(45) Date of Patent: *Nov. 13, 2012

US008309659B2

(54) FILLED POLYOLEFIN COMPOSITIONS

(75) Inventors: Enrico Masarati, Castelnovo Val Tidone (IT); Enrico Costantini, Ferrara (IT); Marco Consalvi, Occhiobello (IT)

(73) Assignee: Basell Poliolefine Italia s.r.l., Milan (IT)

( * ) Notice: Subject to any disclaimer, the term of this patent is extended or adjusted under 35 U.S.C. 154(b) by 384 days.

This patent is subject to a terminal disclaimer.

(21) Appl. No.: 12/448,385

(22) PCT Filed: Dec. 12, 2007

(86) PCT No.: PCT/EP2007/063823
§ 371 (c)(1),
(2), (4) Date: Jun. 18, 2009

(87) PCT Pub. No.: WO2008/074713
PCT Pub. Date: Jun. 26, 2008

(65) Prior Publication Data
US 2010/0048807 A1 Feb. 25, 2010

Related U.S. Application Data

(60) Provisional application No. 60/876,733, filed on Dec. 22, 2006.

(30) Foreign Application Priority Data

Dec. 20, 2006 (EP) .................................... 06126685

(51) Int. Cl.
*C08L 23/00* (2006.01)
*C08L 23/10* (2006.01)
*C08L 23/12* (2006.01)

(52) U.S. Cl. ......... 525/240; 525/323; 525/88; 525/191; 524/515; 524/528; 524/502; 524/584; 524/582; 264/328.1

(58) Field of Classification Search ................. 525/323, 525/240, 88, 191; 524/515, 528, 502, 584, 524/582; 264/328.1
See application file for complete search history.

(56) References Cited

U.S. PATENT DOCUMENTS

| | | | |
|---|---|---|---|
| 4,207,373 A * | 6/1980 | Segal | 156/158 |
| 4,399,054 A | 8/1983 | Ferraris et al. | |
| 4,472,524 A | 9/1984 | Albizzati | |
| 4,676,680 A | 6/1987 | Hauger et al. | |
| 4,997,875 A | 3/1991 | Geddes et al. | |
| 5,145,819 A | 9/1992 | Winter et al. | |
| 5,264,174 A | 11/1993 | Takei et al. | |
| 5,286,564 A | 2/1994 | Cecchin et al. | |
| 5,302,454 A | 4/1994 | Cecchin et al. | |
| 5,324,800 A | 6/1994 | Welborn, Jr. et al. | |
| 5,476,911 A | 12/1995 | Morini et al. | |
| 5,529,850 A | 6/1996 | Morini et al. | |
| 5,698,617 A | 12/1997 | Marzola et al. | |
| 5,698,642 A | 12/1997 | Govoni et al. | |
| 5,753,769 A * | 5/1998 | Ueda et al. | 525/323 |
| RE37,384 E | 9/2001 | Winter et al. | |
| 6,413,477 B1 | 7/2002 | Govoni et al. | |
| 6,608,224 B2 | 8/2003 | Guidotti et al. | |
| 6,689,845 B1 | 2/2004 | Govoni et al. | |
| 6,818,187 B2 | 11/2004 | Govoni et al. | |
| 6,841,501 B2 | 1/2005 | Resconi et al. | |
| 6,878,786 B2 | 4/2005 | Resconi et al. | |
| 6,964,997 B2 | 11/2005 | Kikuchi et al. | |
| 7,045,202 B2 | 5/2006 | Tanaka et al. | |
| 7,074,871 B2 | 7/2006 | Cecchin et al. | |
| 7,122,606 B2 | 10/2006 | Tonti et al. | |
| 7,286,126 B2 | 10/2007 | Kim et al. | |
| 7,332,556 B2 | 2/2008 | Cecchin et al. | |

(Continued)

FOREIGN PATENT DOCUMENTS

| | | |
|---|---|---|
| EP | 45977 | 2/1982 |
| EP | 129368 | 12/1984 |
| EP | 135744 | 4/1985 |
| EP | 400333 | 12/1990 |
| EP | 472946 | 3/1992 |

(Continued)

OTHER PUBLICATIONS

L. Resconi et al. "Selectivity in Propene Polymerization with Metallocene Catalysts," *Chem. Rev.*, vol. 100(4), p. 1253-1345 (2000).
A. Gnatowski et al., "Investigations of the influence of compatibilizer and filler type on the properties of chosen polymer blends," *Journal of Materials Processing Technology*, vol. 162-163, p. 52-58 (2005).

(Continued)

*Primary Examiner* — James J Seidleck
*Assistant Examiner* — Deve E Valdez
(74) *Attorney, Agent, or Firm* — Dilworth IP LLC

(57) ABSTRACT

Filled polyolefin compositions comprising:
A) from 20% to 80% by weight of a polypropylene component;
B) from 20% to 80% by weight of a filler;
wherein the percentages of A) and B) are referred to the sum of A) and B), and A) is selected from the following compositions:
a) a polypropylene composition containing from 20% to 80% by weight of a polypropylene fraction $A^I$) having a Melt Flow Rate value of 500 g/10 min. or more, and from 20% to 80% by weight of a polypropylene fraction $A^{II}$) having a Melt Flow Rate value of from 0.1 to 30 g/10 min., the said percentages of $A^I$) and $A^{II}$) being referred to the sum of $A^I$) and $A^{II}$); or
b) a polypropylene composition containing from 15% to 72% by weight of a polypropylene fraction $A^I$) having a Melt Flow Rate value of 500 g/10 min. or more, from 15% to 70% by weight of a polypropylene fraction $A^{II}$) having a Melt Flow Rate value of from 0.1 to 30 g/10 min. and from 0.5% to 15% by weight of a compatibilizer Q), the said percentages of $A^I$), $A^{II}$) and Q) being referred to the sum of $A^I$), $A^{II}$) and Q).

20 Claims, No Drawings

U.S. PATENT DOCUMENTS

| | | |
|---|---|---|
| 7,592,393 B2 | 9/2009 | Pelliconi et al. |
| 2003/0148083 A1 | 8/2003 | Tanaka et al. |
| 2004/0044107 A1 | 3/2004 | Kikuchi et al. |
| 2005/0052440 A1 | 3/2005 | Kim et al. |
| 2005/0106978 A1 | 5/2005 | Cheng et al. |
| 2005/0130544 A1 | 6/2005 | Cheng et al. |
| 2006/0264557 A1 | 11/2006 | Lustiger et al. |
| 2007/0066758 A1* | 3/2007 | McArdle et al. ............... 525/240 |
| 2007/0251572 A1* | 11/2007 | Hoya et al. .................... 136/256 |
| 2009/0118414 A1* | 5/2009 | Kitade et al. .................. 524/451 |

FOREIGN PATENT DOCUMENTS

| | | |
|---|---|---|
| EP | 485823 | 5/1992 |
| EP | 548696 | 6/1993 |
| EP | 572028 | 12/1993 |
| EP | 573862 | 12/1993 |
| EP | 662380 | 11/1994 |
| EP | 782587 | 7/1997 |
| EP | 1333056 | 8/2003 |
| GB | 2260335 | 4/1993 |
| WO | 91/02012 | 2/1991 |
| WO | 92/00333 | 1/1992 |
| WO | 00/02929 | 1/2000 |
| WO | 01/62764 | 8/2001 |
| WO | 03/011962 | 2/2003 |
| WO | 2005/005495 | 1/2005 |
| WO | 2008/074712 | 6/2008 |
| WO | 2008/074715 | 6/2008 |

* cited by examiner

FILLED POLYOLEFIN COMPOSITIONS

The present invention concerns polyolefin compositions containing fillers, having an improved balance of processability and mechanical properties.

In particular, the compositions of the present invention allow to achieve relatively high values of Melt Flow Rate, hereinafter abbreviated into MFR, notwithstanding the presence of significant and even very high amounts of fillers, associated with a very favorable and unusual balance of mechanical properties.

In order to increase the final MFR values of such kind of compositions, it has been already suggested in the art to use propylene polymers with high MFR values. In particular, according to U.S. Pat. No. 4,997,875, improved melt flow characteristics and good mechanical properties are obtained by blending up to 50% by weight of a fiber reinforcing agent to an as-polymerized propylene polymer material having MFR values from about 55 to about 430 g/10 min.

According to U.S. patent application No. 20060264557, reinforced polypropylene compositions with good impact properties are obtained by blending even high amounts of organic fibers and optionally inorganic fillers to a polypropylene resin having a MFR of from about 20 to about 1500 g/10 min. Actually the highest MFR values of the propylene polymers used in the examples of the said document are of 400-430 g/10 min.

It has now been found that an improved balance of flexural modulus and flexural strength at room temperature and at 80° C., impact resistance, tensile properties and heat deflection temperature (hereinafter HDT), is achieved by blending fillers with propylene polymers having very high MFR values.

Other improved properties achieved by the compositions of the present invention are dimensional stability, creep resistance and environmental stress cracking resistance. Moreover, in comparison with the filled compositions known in the art, the compositions of the invention present also higher ability to fill cavity moulds, even with complex design, and bring to a reduction of cycle times in injection moulding applications.

The enhanced flowability of the compositions of the present invention, together with their higher stiffness values, makes it also possible to reduce the thickness of moulded items produced.

In detail, the present invention provides filled polyolefin compositions comprising:
A) from 20% to 80% by weight of a polypropylene component;
B) from 20% to 80% by weight of a filler;
wherein the percentages of A) and B) are referred to the sum of A) and B), and A) is selected from the following compositions:
a) a polypropylene composition containing from 20% to 80% by weight of a polypropylene fraction $A^I$) having a Melt Flow Rate ($MFR^I$) value of 500 g/10 min. or more, and from 20% to 80% by weight of a polypropylene fraction $A^{II}$) having a Melt Flow Rate ($MFR^{II}$) value of from 0.1 to 30 g/10 min., the said percentages of $A^I$) and $A^{II}$) being referred to the sum of $A^I$) and $A^{II}$); or
b) a polypropylene composition containing from 15% to 72% by weight of a polypropylene fraction $A^I$) having a Melt Flow Rate ($MFR^I$) value of 500 g/10 min. or more, from 15% to 70% by weight of a polypropylene fraction $A^{II}$) having a Melt Flow Rate ($MFR^{II}$) value of from 0.1 to 30 g/10 min. and from 0.5% to 15% by weight of a compatibilizer Q), the said percentages of $A^I$), $A^{II}$) and Q) being referred to the sum of $A^I$), $A^{II}$) and Q);

said fractions $A^I$) and $A^{II}$) being independently selected from propylene homopolymers and random copolymers of propylene containing up to 5% by moles of ethylene and/or $C_4$-$C_{10}$ α-olefin(s); all the Melt Flow Rate values being measured according to ISO 1133 with a load of 2.16 kg at 230° C.

Preferably the compositions of the present invention comprise from 20% to 70% by weight, more preferably from 30% to 60% by weight of A) and from 30% to 80% by weight, more preferably from 40% to 70% by weight of B) with respect to the total weight of A) and B). The fraction $A^I$) as defined above is a propylene polymer or polymer composition having very high MFR values, namely of 500 g/10 min. or more, preferably of 1200 g/10 min. or more, in particular from 500 to 2500 g/10 min. or from 1200 to 2500 g/10 min.

Moreover such MFR values are preferably obtained without any degradation treatment. In other words, the fraction $A^I$) is preferably made of as-polymerized propylene polymers, not subjected after polymerization to any treatment able to substantially change the MFR value. Thus, also the molecular weights of fraction $A^I$) are substantially those directly obtained in the polymerization process used to prepare the propylene polymers.

Alternatively, but not preferably, the said MFR values are obtained by degradation (visbreaking) of propylene polymers having lower MFR values.

The comonomers in the propylene copolymers that can be present in fraction $A^I$) are selected from ethylene and/or $C_4$-$C_{10}$ α-olefins, such as for example butene-1, pentene-1,4-methylpentene-1, hexene-1 and octene-1. The preferred comonomers are ethylene and butene-1.

All the propylene polymers and copolymers of fraction $A^I$) can be prepared by using a Ziegler-Natta catalyst or a metallocene-based catalyst system in the polymerization process. The said catalysts and the polymerization processes are known in the art.

Conventional molecular weight regulators known in the art, such as chain transfer agents (e.g. hydrogen or $ZnEt_2$), may be used.

Preferred examples of Ziegler-Natta catalysts are the supported catalyst systems comprising a trialkylaluminum compound, optionally an electron donor, and a solid catalyst component comprising a halide or halogen-alcoholate of Ti and optionally an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Examples of specific Ziegeler-Natta catalysts and polymerization processes suited for preparing the propylene polymers of fraction $A^I$) are disclosed in EP0622380.

Preferably, when the propylene polymers of fraction $A^I$) are prepared with Ziegler-Natta catalysts they have, at an MFR ranging from 600 to 1000 g/10 min., Mw values from 100,000 to 60,000, and at an MFR of higher than 1000 g/10 min., Mz values higher than or equal to 140000, as disclosed in the said EP0622380.

Other preferred features for the said propylene polymers prepared with Ziegler-Natta catalysts are:
Mz/Mw values from 2.5 to 2.8;
Isotacticity Index, in terms of weight fraction insoluble in xylene at room temperature (about 25° C.) higher than or equal to 95%, more preferably higher than or equal to 97%.

More preferably, the propylene polymers of fraction $A^I$) are obtained directly in polymerization in the presence of a metallocene-based catalyst system.

The polymerization conditions in general do not need to be different from those used with Ziegler-Natta catalysts.

The preferred metallocene-based catalyst system is obtainable by contacting:

a) a metallocene compound of formula (I):

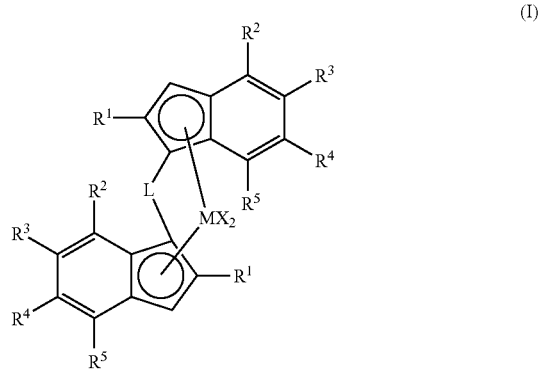

wherein

M is a transition metal belonging to group 3, 4, 5, 6 or to the lanthanide or actinide groups in the Periodic Table of the Elements; preferably M is titanium, zirconium or hafnium; X, same or different, are hydrogen atoms, halogen atoms, or R, OR, $OSO_2CF_3$, OCOR, SR, $NR_2$ or $PR_2$ groups, wherein R are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$; even more preferably $(Z(R'')_2)_n$ is $Si(CH_3)_2$.

$R^1$ is a $C_1$-$C_{40}$ hydrocarbon radical optionally containing heteroatoms belonging to groups 13-17 of the Periodic Table of the Elements; preferably $R^1$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; more preferably $R^1$ is a linear or branched, saturated or unsaturated $C_1$-$C_{20}$-alkyl radical;

$R^2$, $R^3$ $R^4$ and $R^5$, equal to or different from each other, are hydrogen atoms or $C_1$-$C_{40}$ hydrocarbon radicals optionally containing heteroatoms belonging to groups 13-17 of the Periodic Table of the Elements; or two R groups among $R^2$, $R^3$ $R^4$ and $R^5$ form a $C_4$-$C_7$ ring that can be unsaturater or saturated optionally containing heteroatoms belonging to groups 14-16 of the Periodic Table of the Elements; the ring formed can bear $C_1$-$C_{20}$ hydrocarbon substituents;

b) at least an alumoxane or a compound able to form an alkylmetallocene cation.

A specific example of metallocene compound a) is rac-dimethylsilylbis(2-methyl-4,5-benzo-indenyl)-zirconium dichloride.

The alumoxanes are considered to be linear, branched or cyclic compounds containing at least one group of the type:

wherein the substituents U, same or different, are hydrogen atoms, halogen atoms, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen.

In particular, alumoxanes of the formula:

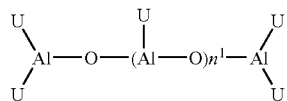

can be used in the case of linear compounds, wherein $n^1$ is 0 or an integer of from 1 to 40 and the substituents U are defined as above; or alumoxanes of the formula:

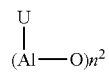

can be used in the case of cyclic compounds, wherein n is an integer from 2 to 40 and the U substituents are defined as above.

Examples of suitable alumoxanes are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl) alumoxane (TTMBAO).

Examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion E⁻ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. All these compounds containing boron atoms can be used in a molar ratio between boron and the metal of the metallocene comprised between about 1:1 and about 10:1; preferably 1:1 and 2:1; more preferably about 1:1.

Other preferred features for the said propylene polymers prepared with a metallocene-based catalyst system are:

distribution of molecular weight Mw/Mn lower than 4; more preferably lower than 3; most preferably lower than 2.7;

isotactic pentads (mmmm) measured with $^{13}C$-NMR, higher than 90%; more preferably higher than 92%;

xylene solubles at 25° C. below 2% by weight, more preferably below 1.6% by weight;

melting point measured by means of DSC, higher than 143° C.;

The polypropylene fraction $A^{II}$) can be any propylene homopolymer or copolymer having a MFR value from 0.1 to 30 g/10 min. Thus the said fraction $A^{II}$) can be prepared with conventional catalysts (Ziegler-Natta or metallocene-based) in conventional polymerization processes.

Preferred features for the said polypropylene fraction $A^{II}$) are:

MFR values from 0.5 to 20 g/10 min.;

Isotacticity Index, in terms of weight fraction insoluble in xylene at room temperature (about 25° C.) higher than or equal to 92%, more preferably higher than or equal to 95%;

amount of comonomer(s) up to 9% by moles, more preferably up to 5% by moles;

Mw/Mn>4, more preferably Mw/Mn>7 and most preferably Mw/Mn>10;

melt strength, measured at 230° C., higher than 1.50 cN, in particular ranging from 1.60 to 12.00 cN, more preferably from 1.60 to 8.00 cN.

Examples of comonomer(s) that can be present in $A^I$) are the same as previously defined for the polypropylene fraction $A^I$).

Specially preferred for use as fraction $A^{II}$) are compositions containing from 30% to 70% by weight, preferably from 40% to 60% by weight, of a fraction i) having a molecular weight distribution, in terms of Mw/Mn ratio, from 4 to 9, and from 30% to 70% by weight, preferably from 40% to 60% by weight, of a fraction ii) having a molecular weight distribution, in terms of Mw/Mn ratio, of higher than 10, said fractions i) and ii) being independently selected from propylene homopolymers and random copolymers of propylene containing up to 5% by moles of ethylene and/or $C_4$-$C_{10}$ α-olefin(s); the said percentages of i) and ii) being referred to the sum of i) and ii).

The said fraction ii) can also be used as fraction $A^{II}$).

To obtain propylene homopolymers and copolymers with Mw/Mn values of 10 or more, it is possible to carry out the polymerization process in two or more stages with different amounts of molecular weight regulators (in particular hydrogen). Examples of such kind process, which is preferably carried out in gas phase, are disclosed in EP0573862.

It is also possible (and preferred) to prepare the said homopolymers and copolymers with a gas-phase polymerization process carried out in at least two interconnected polymerization zones. Said polymerization process is described in the European patent EP 782587 and in the International patent application WO00/02929.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C., preferably from 70° C. to 90° C. The process can be carried out under operating pressure of between 0.5 and MPa, preferably between 1.5 and 6 MPa. Preferably, the various catalyst components are fed to the first polymerization zone, at any point of said first polymerization zone. However, they can also be fed at any point of the second polymerization zone.

In the polymerization process means are provided which are capable of totally or partially preventing the gas and/or liquid mixture present in the raiser from entering the downcomer and a gas and/or liquid mixture having a composition different from the gas mixture present in the raiser is introduced into the downcomer. According to a preferred embodiment, the introduction into the downcomer, through one or more introduction lines, of said gas and/or liquid mixture having a composition different from the gas mixture present in the raiser is effective in preventing the latter mixture from entering the downcomer. The gas and/or liquid mixture of different composition to be fed to the downcomer can optionally be fed in partially or totally liquefied form. The molecular weight distribution of the growing polymers can be conveniently tailored by carrying out the polymerization process in a reactor diagrammatically represented in FIG. 4 of the International Patent Application WO00/02929 and by independently metering the comonomer(s) and customary molecular weight regulators, particularly hydrogen, in different proportion into at least one polymerization zone, preferably into the raiser.

The filler component B) to be used in the compositions of the present invention can be organic or inorganic.

Preferred are fibers, both organic and inorganic, and the other inorganic fillers (different from fibers), such as metallic flakes, glass flakes, milled glass, glass spheres and mineral fillers, like talc, calcium carbonate, mica, wollastonite or silicates in general, kaolin, barium sulfate, metal oxides and hydroxides.

Another suited filler is wood flour.

Suitable fibers for the present compositions include fibers made of glass, metal, ceramic, graphite, and organic polymers such as polyesters and nylons, e.g., aramids, in filamentary form, all of which are commercially available.

Glass fibers are preferred.

The glass fibers may be either cut glass fibers or long glass fibers, or may be in the form of continuous filament fibers, although preference is given to using cut glass fibers, also known as short fibers or chopped strands.

In general, the glass fibers can have a length of from 1 to 50 mm.

The cut or short glass fibers used in the compositions of the present invention preferably have a length of from 1 to 6 mm, more preferably from 3 to 4.5 mm, and a diameter of from 10 to 20 µm, more preferably from 12 to 14 µm.

As previously said, the polypropylene compositions of the present invention can also comprise a compatibilizer Q).

One type which can be used are low molecular weight compounds having reactive polar groups, which serve to make the fillers less hydrophilic and therefore more compatible with the polymer. Suitable compounds are, for example, silanes such as aminosilanes, epoxysilanes, amidosilanes or acrylosilanes.

However, the compatibilizers preferably comprise a modified (functionalized) polymer and optionally a low molecular weight compound having reactive polar groups. Modified olefin polymers, in particular propylene homopolymers and copolymers, like copolymers of ethylene and propylene with each other or with other alpha olefins, are most preferred, as they are highly compatible with the component A) of the compositions of the present invention. Modified polyethylene can be used as well.

In terms of structure, the modified polymers are preferably selected from graft or block copolymers.

In this context, preference is given to modified polymers containing groups deriving from polar compounds, in particular selected from acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

Particular preference is given to using a propylene polymer grafted with maleic anhydride as the modified polymer.

The low molecular weight compound serves to couple the filler to the modified polymer and thus to bind it securely to the propylene polymer component A). These are usually bifunctional compounds, in which case one functional group can enter into a binding interaction with the filler and the second functional group can enter into a binding interaction with the modified polymer. The low molecular weight compound is preferably an amino- or epoxysilane, more preferably an aminosilane.

When the filler B) comprises glass fibers, the aminosilanes bond with the silane hydroxyl groups to the glass fiber, while the amino groups form a stable amide bond, for example with polypropylene grafted with maleic anhydride.

It is particularly advantageous to apply the low molecular weight compound to the glass fibers before they are incorporated into the composition.

The modified polymer can be produced in a simple manner by reactive extrusion of the polymer, for example with maleic anhydride in the presence of free radical generators (like organic peroxides), as disclosed for instance in EP0572028.

Preferred amounts of groups deriving from polar compounds in the modified polymers are from 0.5 to 3% by weight.

Preferred values of MFR for the modified polymers are from 50 to 400 g/10 min.

It is also possible to use a masterbatch which comprises the fillers and the compatibilizer in premixed form.

The polyolefin compositions according to the invention are obtainable by melting and mixing the components, and the mixing is effected in a mixing apparatus at temperatures generally of from 180 to 310° C., preferably from 190 to 280° C., more preferably from 200 to 250° C.

Any known apparatus and technology can be used for this purpose.

Useful mixing apparatus in this context are in particular extruders or kneaders, and particular preference is given to twin-screw extruders. It is also possible to premix the components at room temperature in a mixing apparatus.

Preference is given to initially melting component A) and optionally component Q), and subsequently mixing component B) with the melt, in order to reduce the abrasion in the mixing apparatus and the fiber breakage (when fibers are used as filler).

During the preparation of the polypropylene compositions of the present invention, besides the two main components A) and B) and possibly some compatibilizing agents Q), it is possible to introduce additives commonly employed in the art, such as stabilizing agents (against heat, light, U.V.), plasticizers, antistatic and water repellant agents.

Particularly preferred features for the compositions of the present invention are:

Density: from 1.1 to 4 kg/dm³, more preferably 1.1 to 1.8 kg/dm³;

Flexural Modulus: from 2500 to 19000 MPa, more preferably 5000 to 17000 MPa;

Tensile Modulus: 2500 to 20000 MPa, more preferably 5000 to 18000 MPa;

Charpy unnotched at 23° C.: from 30 to 200 kJ/m², more preferably 35 to 65 kJ/m²;

Charpy unnotched at −30° C.: from 30 to 150 kJ/m², more preferably from 40 to 70 kJ/m²;

Charpy notched at 23° C.: from 5 to 200 kJ/m², more preferably from 10 to 20 kJ/m²;

Charpy notched at −30° C.: from 5 to 150 kJ/m², more preferably from 10 to 25 kJ/m²;

Tensile Strength at break: from 50 to 150 MPa, more preferably from 80 to 140 MPa;

Elongation at break: from 1 to 200%, in particular from 1 to 5%;

HDT 1.8 MPa: from 60 to 155° C., more preferably from 135 to 155° C.

When fillers different from glass fibers are used, preferred features for the compositions of the present invention are:

Density: from 1.1 to 4 kg/dm$^3$, more preferably 1.1 to 1.9 kg/dm$^3$;

Flexural Modulus: from 2500 to 14000 MPa, more preferably 5000 to 12000 MPa;

Tensile Modulus: 2500 to 14000 MPa, more preferably 5000 to 12000 MPa;

Charpy unnotched at 23° C.: from 3 to 25 kJ/m$^2$, more preferably 4 to 20 kJ/m$^2$;

Charpy notched at 23° C.: from 1 to 10 kJ/m$^2$, more preferably from 1.5 to 7 kJ/m$^2$;

Tensile Strength at break: from 20 to 60 MPa, more preferably from 20 to 50 MPa.

Due to their favorable balance of properties, the compositions of the present invention can be used in many applications, like injection moulded articles, in particular parts for automotive, electrical appliances, furniture, or formed articles in general, in particular sheets, parts for electrical appliances, furniture, housewares, or as hyper-filled masterbatches.

In particular, when the amount of component B) is particularly high, indicatively from 50% to 80% by weight with respect to the total weight of A) and B), the compositions of the present invention can also be advantageously used as concentrates, to introduce fillers in polymer compositions, in particular polyolefin compositions, by blending with additional polymers.

The following examples are given for illustrating but not limiting purposes.

The following analytical methods are used to determine the properties reported in the description and in the examples.

Melt Flow Rate (MFR): ISO 1133 with a load of 2.16 kg at 230° C.;

Intrinsic Viscosity Measured in tetrahydronaphthalene at 135° C.;

Density: ISO 1183;

Flexural Modulus (secant): ISO 178 on rectangular specimens 80×10×4 mm from T-bars ISO527-1 Type 1A;

Tensile Modulus (secant): ISO 527/-1, -2 on specimens Type 1A with velocity of 1 mm/min, span of 50 mm;

Charpy unnotched: ISO 179 (type 1, edgewise) on rectangular specimens 80×10×4 mm from T-bars ISO527-1 Type 1A;

Charpy notched: ISO 179 (type 1, edgewise, Notch A) on rectangular specimens 80×10×4 mm from T-bars ISO527-1 Type 1A;

Tensile Strength at Break: ISO 527/-1, -2 on specimens Type 1A with velocity of 50 mm/min, span of 50 mm;

Elongation at Break: ISO 527/-1, -2 on specimens Type 1A with velocity of 50 mm/min, span of 50 mm;

HDT (1.80 MPa): (heat deflection temperature) ISO 75A-1. -2 on specimens clause 6.

T-Bar Preparation (Injection Moulded)

Test specimens are injection moulded according to Test Method ISO 1873-2 (1989).

Determination of Isotacticity Index (Solubility in Xylene at Room Temperature, in % by Weight)

2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

MWD Determination

The Mn and Mw values are measured by way of gel permeation chromatography (GPC) at 145° C. using a Alliance GPCV 2000 instrument (Waters) equipped with three mixed-bed columns TosoHaas TSK GMHXL-HT having a particle size of 13 μm. The dimensions of the columns are 300×7.8 mm. The mobile phase used is vacuum distilled 1,2,4-Trichlorobenzene (TCB) and the flow rate is kept at 1.0 ml/min. The sample solution is prepared by heating the sample under stirring at 145° C. in TCB for two hours. The concentration is 1 mg/ml. To prevent degradation, 0.1 g/l of 2,6-diterbutyl-p-cresol are added. 326.5 μL of solution are injected into the column set. A calibration curve is obtained using 10 polystyrene standard samples (EasiCal kit by Polymer Laboratories) with molecular weights in the range from 580 to 7500000; additionally two other standards with peak molecular weight of 11600000 and 13200000 from the same manufacturer are included. It is assumed that the K values of the Mark-Houwink relationship are:

K=1.21×10$^{-4}$ dL/g and α=0.706 for the polystyrene standards;

K=1.90×10$^{-4}$ dL/g and α=0.725 for the polypropylene samples;

K=1.93×10$^{-4}$ dL/g and α=0.725 for the propylene copolymer samples.

A third order polynomial fit is used for interpolate the experimental data and obtain the calibration curve. Data acquisition and processing is done by using Empower 1.0 with GPCV option by Waters.

Melting Temperature

Determined by DSC according ISO 3146 with a heating rate of 20K per minute.

$^{13}$C-NMR (for Metallocene-Produced Propylene Polymers)

NMR analysis. 13C-NMR spectra of PP are acquired on a DPX-400 spectrometer operating at 100.61 MHz in the Fourier transform mode at 120° C. The peak of the mmmm pentad carbon are used as internal reference at 21.8 ppm and 29.9 ppm respectively. The samples are dissolved in 1,1,2,2-tetrachloroethane-d2 at 120° C. with a 8% wt/v concentration in a 5 mm tube. Each spectrum is acquired with a 90° pulse, 12 seconds of delay between pulses and CPD (WALTZ 16) to remove 1H-13C coupling. About 2500 transients are stored in 32K data points using a spectral window of 6000 Hz.

The assignments of PP spectra are made according to "Selectivity in Propylene Polymerization with Metallocene Catalysts", L. Resconi, L. Cavallo, A. Fait, F. Piemontesi, Chem. Rev., 100, 1253, (2000))

The mmmm content is obtained modelling the experimental pentad distribution with the enantiomorphic site model. The mmmm content of PP with high content of 2.1 (E) and 1.3 (H) errors is obtained as:

$$[mmmm]=100(\Sigma[CH_3]-5[mrrm]-5-[E]-5[H])/(\Sigma[CH_3])$$

where Σ[CH$_3$] is the sum of all CH$_3$ groups.

The content of 2.1 and 3.1 errors is obtained as:

[E]=100(E$_9$/Σ[CH$_2$])

[H]=100(0.5H$_2$Σ[CH$_2$])

where E$_9$ is the peak at 42.14 ppm, H$_2$ is the peak at 30.82 ppm and Σ[CH$_2$] is the sum of all CH$_2$ groups.

Melt Strength

The apparatus used is a Toyo-Sieki Seisakusho Ltd. melt tension tester provided with a computer for data processing. The method consists in measuring the tensile strength of a strand of molten polymer stretched at a specific stretch velocity. In particular, the polymer to be tested is extruded at 230° C. at 0.2 mm/min through a die with a capillary hole 8 mm long and 1 mm in diameter. The exiting strand is then stretched, by using a system of traction pulleys, at a constant acceleration of 0.0006 m/sec$^2$, measuring the tension until the breaking point. The apparatus registers the tension values of the strand as a function of the stretching. The melt strength corresponds to the melt tension at polymer break.

EXAMPLES 1 TO 15 AND COMPARATIVE EXAMPLES 1 TO 3

The following materials are used as components A), B) and Q).

Component A)

PP-1: Propylene homopolymer, with MFR of 2300 g/10 min, Mw/Mn of 2.6 and isotacticity index in xylene at room temperature of 98.5% (isotactic pentades (mmmm) higher than 92%), DSC melting temperature of 146° C., intrinsic viscosity of 0.47 dl/g, in form of pellets;

PP-2: Propylene homopolymer, with MFR of 12 g/10 min, Mw/Mn of 5.4 and isotacticity index of 96.7%, in form of pellets;

PP-3: Propylene copolymer containing 1.6% by weight of ethylene, with MFR of 3 g/10 min, Mw/Mn of 19.2 and isotacticity index of 96%, in form of pellets;

PP-4: Propylene homopolymer, with MFR of 550 g/10 min, Mw/Mn of 2.3 and isotacticity index in xylene at room temperature of 98.7% (isotactic pentades (mmmm) higher than 92%), DSC melting temperature of 145.3° C., intrinsic viscosity of 0.69 dl/g, in form of pellets;

PP-5: Propylene homopolymer, with MFR of 2.5 g/10 min, Mw/Mn of 8.4 and melt strength of 6.74 cN, in form of pellets.

PP-1 is obtained with a catalyst system prepared as described in PCT/EP2004/007061 by using rac-dimethylsilylbis(2-methyl-4,5-benzo-indenyl)-zirconium dichloride.

The catalyst system in the form of catalyst mud obtained as described in PCT/EP2004/007061 is fed in a precontact vessel in which it is diluted with about 5 (Kg/h) of propane. From the pre-contact vessel the catalyst system is fed to a prepolymerization loop in which propylene is fed at the same time. The prepolymerization temperature is of 45° C. The residence time of the catalyst in the prepolymerization loop is 8 minutes. The prepolymerized catalyst obtained in the prepolymerization loop is then continuously fed into a loop reactor in which propylene is fed at a rate of 340 Kg/h. The polymerization temperature is of 70° C. The polymer is discharged from the loop reactor, separated from the unreacted monomer and dried. The MFR of the product is controlled by the feed of hydrogen, to be adjusted to get the required MFR of the polymer. In the case of PP-1 the hydrogen concentration is of 1080 ppm.

PP-4 is prepared in the same way as PP-1 with the difference that propylene is fed at a rate of 329 Kg/h and the hydrogen feed is 550 ppm.

Component B)

GF: Glass fibers White ECS O3T 480 (Nippon Electric Glass Company Ltd), with fiber length of 3 mm and diameter of 13 μm.

Component Q)

PP-MA: Propylene homopolymer grafted with maleic anhydride (MA), with MFR of 115 g/10 min and MA content of 1% weight (Polybond 3200, sold by Chemtura).

Component A) contains also about 0.3% by weight of conventional antioxidant additives. In Example 13 it contains also 300 ppm by weight of phthalocyanine blue (PV-Echtblau 2GL SP, Clariant). In Example 14 it contains also 0.18% by weight of Millad 3988 3,4-dimethylbenzylidene sorbitol.

The composition are prepared by extrusion, using a twin screw extruder, model Werner&Pfleiderer ZSK40SC.

This line has a process length of approx 43 L/D and is provided with gravimetric feeders. Components A) and Q) are fed into the first barrel and component B) is fed into the fifth barrel, via forced side feeding.

A strand die plate with cooling bath and strand cutter Scheer SGS100 is used to form pellets; vacuum degassing (barrel No. 8) is also applied to extract fumes and decomposition products.

Running Conditions:

Screw speed: 200 rpm;

Capacity: 50-60 kg/h;

Barrel Temperature: 200-220° C.

The final properties of the so obtained composition are reported in Tables I to V, together with the relative amounts of the components.

TABLE I

| Example No. | 1 | 2 | 3 | 4 |
|---|---|---|---|---|
| COMPONENTS (% by weight) | | | | |
| PP-1 | 17.6 | 23.75 | 23.75 | 15.9 |
| PP-2 | 17.6 | 23.75 | — | 15.8 |
| PP-3 | 17.6 | — | 23.75 | 15.8 |
| G F | 45 | 50 | 50 | 50 |
| PP-MA | 2.2 | 2.5 | 2.5 | 2.5 |
| A) | 55 | 50 | 50 | 50 |
| B) | 45 | 50 | 50 | 50 |
| A$^I$) | 32 | 47.5 | 47.5 | 31.8 |
| A$^{II}$) | 64 | 47.5 | 47.5 | 63.2 |
| Q) | 4 | 5 | 5 | 5 |
| i) | 50 | 100 | — | 50 |
| ii) | 50 | — | 100 | 50 |
| PROPERTIES | | | | |
| Density (kg/dm$^3$) | 1.275 | 1.334 | 1.333 | 1.330 |
| MFR (dg/min) | 5.3 | 14.6 | 6 | 6.5 |
| Flexural Modulus (MPa) | 10090 | 11630 | 11370 | 11470 |
| Tensile Modulus (MPa) | 10440 | 12010 | 12100 | 12110 |
| Charpy unnotched at 23° C. (kJ/m$^2$) | 61.2 | 51 | 63.8 | 56.4 |
| Charpy unnotched at −30° C. (kJ/m$^2$) | 67.5 | 52 | 68.9 | 61 |
| Charpy notched at 23° C. (kJ/m$^2$) | 13 | 13.7 | 13.8 | 13 |
| Charpy notched at −30° C. (kJ/m$^2$) | 16.8 | 18.1 | 17.9 | 19 |
| Tensile Strength at break (MPa) | 121.1 | 127 | 130 | 129 |
| Elongation at break (%) | 2.5 | 1.8 | 2.4 | 1.9 |
| HDT 1.82 N (° C.) | 150 | 148 | 146 | 149 |

TABLE II

| Example No. | 5 | 6 | 7 |
|---|---|---|---|
| COMPONENTS (% by weight) | | | |
| PP-1 | 14 | 14.1 | 12.34 |
| PP-2 | 15.8 | 14.1 | 12.33 |
| PP-3 | 17.7 | 14.1 | 12.33 |
| G F | 50 | 55 | 60 |
| PP-MA | 2.5 | 2.7 | 3 |
| A) | 50 | 45 | 40 |
| B) | 50 | 55 | 60 |
| $A^I$) | 28 | 31.3 | 30.8 |
| $A^{II}$) | 67 | 62.7 | 61.7 |
| Q) | 5 | 6 | 7.5 |
| i) | 47.2 | 50 | 50 |
| ii) | 52.8 | 50 | 50 |
| PROPERTIES | | | |
| Density (kg/dm$^3$) | 1.335 | 1.404 | 1.453 |
| MFR (dg/min) | 5.9 | 4.7 | 3.4 |
| Flexural Modulus (MPa) | 11360 | 12500 | 14080 |
| Tensile Modulus (MPa) | 12150 | 12960 | 14250 |
| Charpy unnotched at 23° C. (kJ/m$^2$) | 57.2 | 49.4 | 46 |
| Charpy unnotched at −30° C. (kJ/m$^2$) | 61 | 57 | 49 |
| Charpy notched at 23° C. (kJ/m$^2$) | 13.1 | 12.7 | 12.2 |
| Charpy notched at −30° C. (kJ/m$^2$) | 19.3 | 19 | 18.5 |
| Tensile Strength at break (MPa) | 126.6 | 126.3 | 122 |
| Elongation at break (%) | 2.2 | 1.7 | 1.7 |
| HDT 1.82 N (° C.) | 148 | 149.2 | 148 |

TABLE III

| Example No. | 8 | 9 | 10 | 11 |
|---|---|---|---|---|
| COMPONENTS (% by weight) | | | | |
| PP-1 | 35.5 | 12.8 | | 18.5 |
| PP-4 | | | 18.5 | |
| PP-3 | 12 | 34.2 | 18.5 | — |
| PP-5 | — | — | | 18.5 |
| G F | 50 | 50 | 60 | 60 |
| PP-MA | 2.5 | 3 | 3 | 3 |
| A) | 50 | 50 | 40 | 40 |
| B) | 50 | 50 | 60 | 60 |
| $A^I$) | 71 | 25.6 | 46.25 | 46.25 |
| $A^{II}$) | 24 | 68.4 | 46.25 | 46.25 |
| Q) | 5 | 6 | 7.5 | 7.5 |
| PROPERTIES | | | | |
| Density (kg/dm$^3$) | 1.330 | 1.331 | 1.469 | 1.476 |
| MFR (dg/min) | 6.2 | 1.3 | 4.6 | 10.2 |
| Flexural Modulus (MPa) | 11250 | 11130 | 14350 | 13770 |
| Tensile Modulus (MPa) | 12020 | 11800 | 14570 | 13890 |
| Charpy unnotched at 23° C. (kJ/m$^2$) | 59 | 62 | 52 | 55 |
| Charpy unnotched at −30° C. (kJ/m$^2$) | 61 | 65 | 54 | 52 |
| Charpy notched at 23° C. (kJ/m$^2$) | 13.8 | 13.7 | 13.4 | 13.6 |
| Charpy notched at −30° C. (kJ/m$^2$) | 17.4 | 18.1 | 21 | 20 |
| Tensile Strength at break (MPa) | 129 | 127 | 131 | 120 |
| Elongation at break (%) | 2.2 | 2.5 | 2 | 1.2 |
| HDT 1.82 N (° C.) | 146 | 147 | 150 | 148 |

TABLE IV

| Example No. | 12 | 13 | 14 | 15 |
|---|---|---|---|---|
| COMPONENTS (% by weight) | | | | |
| PP-1 | 18.5 | 18.5 | 18.5 | 15.85 |
| PP-2 | 18.5 | — | — | — |
| PP-3 | — | 18.5 | 18.5 | 15.85 |
| G F | 60 | 60 | 60 | 65 |
| PP-MA | 3 | 3 | 3 | 3.3 |
| A) | 40 | 40 | 40 | 35 |
| B) | 60 | 60 | 60 | 65 |
| $A^I$) | 46.25 | 46.25 | 46.25 | 45.29 |
| $A^{II}$) | 46.25 | 46.25 | 46.25 | 45.29 |
| Q) | 7.5 | 7.5 | 7.5 | 9.42 |
| PROPERTIES | | | | |
| Density (kg/dm$^3$) | 1.470 | 1.476 | 1.475 | 1.557 |
| MFR (dg/min) | 9.9 | 5.9 | 6.8 | 3.8 |
| Flexural Modulus (MPa) | 14110 | 14420 | 14350 | 15050 |
| Tensile Modulus (MPa) | 14200 | 14630 | 14750 | 16060 |
| Charpy unnotched at 23° C. (kJ/m$^2$) | 43 | 45 | 44 | 40 |
| Charpy unnotched at −30° C. (kJ/m$^2$) | 46 | 47 | 47 | 41 |
| Charpy notched at 23° C. (kJ/m$^2$) | 13.1 | 12.7 | 13.7 | 12.4 |
| Charpy notched at −30° C. (kJ/m$^2$) | 21 | 22 | 21 | 21.5 |
| Tensile Strength at break (MPa) | 121 | 127 | 130 | 121 |
| Elongation at break (%) | 1.7 | 2.2 | 2 | 1.6 |
| HDT 1.82 N (° C.) | 150 | 148 | 148 | 150 |

TABLE V

| Comparison Example No. | 1 | 2 | 3 |
|---|---|---|---|
| COMPONENTS (% by weight) | | | |
| PP-1 | 47.5 | — | — |
| PP-2 | — | 58 | 47.5 |
| G F | 50 | 40 | 50 |
| PP-MA | 2.5 | 2 | 2.5 |
| A) | 50 | 60 | 50 |
| B) | 50 | 40 | 50 |
| PROPERTIES | | | |
| Density (kg/dm$^3$) | 1.318 | 1.217 | 1.336 |
| MFR (dg/min) | 150 | 3 | 2.6 |
| Flexural Modulus (MPa) | 11120 | 8270 | 10850 |
| Tensile Modulus (MPa) | 11320 | 8890 | 11410 |
| Charpy unnotched at 23° C. (kJ/m$^2$) | 57 | 59.5 | 46.5 |
| Charpy unnotched at −30° C. (kJ/m$^2$) | 51 | 63 | 55 |
| Charpy notched at 23° C. (kJ/m$^2$) | 12.7 | 13.7 | 12 |
| Charpy notched at −30° C. (kJ/m$^2$) | 17 | 16.1 | 18.3 |
| Tensile Strength at break (MPa) | 123.8 | 116 | 122 |
| Elongation at break (%) | 1.4 | 2.4 | 2.1 |
| HDT 1.82 N (° C.) | 143 | 151 | 152 |

Additional Tests

On some of the above described materials, flexural, impact and tensile properties are also measured according to the following ASTM methods.

Flexural Modulus (MPa): ASTM D 790;
Flexural strength (MPa): ASTM D 790;
Izod notched at 23° C. (J/m): ASTM D 256A;
Izod notched at −30° C. (J/m): ASTM D 256A;
Tensile Strength (MPa): ASTM D 638;
Elongation at break (%): ASTM D 638.

The results are reported in Table VI, wherein the tested materials are identified by reference to the previously described examples.

TABLE VI

|  | Example No. | | | | |
| --- | --- | --- | --- | --- | --- |
| PROPERTIES | Comp. 2 | 3 | 4 | 7 | 15 |
| Flexural Modulus (MPa) | 8480 | 11310 | 11420 | 14100 | 15450 |
| Flexural strength (MPa) | 168 | 192 | 177 | 165 | 183 |
| Izod notched at 23° C. (kJ/m$^2$) | 98.5 | 129 | 130 | 116 | 107 |
| Izod notched at −30° C. (kJ/m$^2$) | 125 | 139 | 144 | 140 | 134 |
| Tensile Strength (MPa) | 116 | 115 | 123 | 118 | 98 |
| Elongation at break (%) | 2.8 | 1.5 | 2 | 1.6 | 1.5 |

Spiral Flow Test

A single cavity endless spiral flow mould with 2.5 mm depth is used and the compositions of Example 3 and Comparative Example 2 are injected at a constant melt temperature of 230° C., at different injection pressures (2, 4, 6, 8, 10 MPa).

The injection moulding machine was Sandretto Model 190 with 190 ton clamping force; mould temperature is 40° C.

Under these conditions, for every injection pressure, the flow path length expressed in millimeters is measured, which is proportional to the flowability of the material.

The results are reported in the following Table VII.

TABLE VII

|  | 2 MPa | 4 MPa | 6 MPa | 8 MPa | 10 MPa |
| --- | --- | --- | --- | --- | --- |
| Ex. 3: flow path length | 220 | 520 | 730 | 930 | 1120 |
| Comp. Ex. 2: flow path length | 80 | 260 | 425 | 600 | 720 |

As shown in the table above, the composition of Example 3 presents a much higher spiral flow length with respect to the composition of comparative Example 2.

This means that the compositions of the invention can fill more easily the mould cavities, even those with complex design, allowing to reduce injection moulding pressure, with less problems of warpage, and to reduce moulding cycle times with an economical advantage in terms of productivity.

Flexural Modulus and Flexural Strength at 80° C. (ISO 178)

The compositions of Example 3 and Comparative Example 2 are tested.

The results are reported in the following Table VIII.

TABLE VIII

|  | Flexural modulus (80° C.) (MPa) | Flexural strength (80° C.) (MPa) |
| --- | --- | --- |
| Example 3 | 6820 | 158 |
| Comparison Ex. 2 | 4960 | 137 |

From the above reported results it is clear that the compositions of the invention are suitable to mould under-the-hood parts in the automotive industry for applications requiring outstanding mechanical properties also at high temperatures.

Tensile Creep

The test is carried out according to ISO 899 on ISO T bars specimens (same as for tensile modulus, ISO 527—type 1A). The test conditions are:

Temperature: 105° C.;
Load: 17 MPa.

The results are reported in the following Table IX.

Longer time to fracture and lower deformation to fracture are values that indicate stronger creep resistance (fatigue resistance).

TABLE IX

|  | Time to fracture (hours) | strain to fracture (%) |
| --- | --- | --- |
| Example 3 | 58.5 | 1.45 |
| Comparison Ex. 2 | 41.5 | 2.13 |

EXAMPLES 16 TO 19 AND COMPARATIVE EXAMPLE 4

Filled compositions are prepared by extruding the same PP-1, PP-2, PP-3 and PP-4 polymer materials used in the previous examples (component A)), with a component B) selected from:

Talc Luzenac HAR T84 (supplier Luzenac), in white to grey powder, bulk density=0.65 g/ml and with more than 50% by weight of particles having size of less than 11.5 μm and particle size top cut residue on 40 μm of less than 2% by weight;

Talc HM05 (supplier IMI Fabi S.p.A) in fine white powder at visual inspection, with tamped density=0.31 g/ml and with more than 95% by weight of particles having size of less than 5 μm; and Calcium Carbonate Omyacarb 2T-UM (supplier Omya S.p.A.) in white powder, with $Fe_2O_3$ content of less than 0.03% by weight, and with more than 32% by weight of particles having size of less than 2 μm and less than 0.05% by weight of particles having size of more than 45 μm.

The extrusion is carried out in a single screw extruder, cokneader Buss model MDK70 with 70 mm diameter screw, 17 L/D process length.

The component A) is fed through the first feeding port while component B) is preferably fed through two vertical feeding ports in the melt phase.

The operating parameters are the following:
Screw speed: 270 rpm;
Capacity: 50-60 kg/h;
Barrel temperature: 200-230° C.

A strand die plate with cooling bath and strand cutter is used to form pellets; vacuum degassing is also applied to extract fumes and decomposition products.

The final properties of the so obtained compositions are reported in Table X, together with the relative amounts of the components.

The spiral flow test is carried out as previously described.

TABLE X

| Example No. | 16 | 17 | 18 | 19 | Comp. 4 |
| --- | --- | --- | --- | --- | --- |
| COMPONENTS (% by weight) | | | | | |
| PP1 | 25 |  | 27 | 13 |  |
| PP2 |  | 40 | 13 |  | 50 |
| PP3 | 25 |  |  | 7 |  |

TABLE X-continued

| Example No. | 16 | 17 | 18 | 19 | Comp. 4 |
|---|---|---|---|---|---|
| PP4 | | 20 | | | |
| Talc Luzenac HAR T84 | 50 | | 60 | | 50 |
| Talc HM05C | | 40 | | | |
| Calcium Carbonate Omyacarb 2T UM | | | | 80 | |
| A) | 50 | 60 | 40 | 20 | 50 |
| B) | 50 | 40 | 60 | 80 | 50 |
| $A^I$ | 50 | 33.3 | 67.5 | 35 | |
| $A^{II}$ | 50 | 66.7 | 32.5 | 35 | |
| PROPERTIES | | | | | |
| MFR (dg/min) | 8.6 | 22.8 | 1.8 | 82 | 2.8 |
| Density (kg/dm$^3$) | 1.36 | 1.244 | 1.514 | 1.82 | 1.362 |
| Flexural Modulus (MPa) | 8200 | 5400 | 10100 | 7200 | 7450 |
| Tensile Modulus (MPa) | 7500 | 5170 | 9600 | 6650 | 7100 |
| Charpy unnotched at 23° C. (kJ/m$^2$) | 10 | 13 | 3.4 | 3.4 | 9.5 |
| Charpy notched at 23° C. (kJ/m$^2$) | 1.9 | 1.5 | 1.2 | 1.1 | 1.6 |
| Tensile Strength at break (MPa) | 39 | 37 | 31 | 20 | 38 |
| Elongation at break (%) | 1.5 | 2.2 | 1.3 | 1 | 1.3 |
| Spiral flow length at 2 MPa (mm) | 430 | | | | 250 |
| Spiral flow length at 4 MPa (mm) | 830 | | | | 520 |
| Spiral flow length at 6 MPa (mm) | 1090 | | | | 670 |
| Spiral flow length at 8 MPa (mm) | 1355 | | | | 870 |
| Spiral flow length at 10 MPa (mm) | 1630 | | | | 1110 |

The invention claimed is:

1. Filled polyolefin compositions comprising:
    A) from 20% to 80% by weight of a polypropylene component;
    B) from 20% to 80% by weight of a filler;
    wherein the percentages of A) and B) are referred to the sum of A) and B), and A) is selected from the following compositions:
    a) a polypropylene composition comprising from 20% to 80% by weight of a polypropylene fraction $A^I$) having a Melt Flow Rate (MFR$^I$) value of 500 g/10 min. or more, and from 20% to 80% by weight of a polypropylene fraction $A^{II}$) having a Melt Flow Rate (MFR$^{II}$) value of from 0.1 to 30 g/10 min., the weight percentages of $A^I$) and $A^{II}$) being referred to as the sum of $A^I$) and $A^{II}$); or
    b) a polypropylene composition comprising from 15% to 72% by weight of a polypropylene fraction $A^I$) having a Melt Flow Rate (MFR$^I$) value of 500 g/10 min. or more, from 15% to 70% by weight of a polypropylene fraction $A^{II}$) having a Melt Flow Rate (MFR$^{II}$) value of from 0.1 to 30 g/10 min. and from 0.5% to 15% by weight of a compatibilizer Q), the weight percentages of $A^I$), $A^{II}$) and Q) being referred to as the sum of $A^I$), $A^{II}$) and Q);
    said fractions $A^I$) and $A^{II}$) being independently selected from propylene homopolymers and random copolymers of propylene comprising up to 5% by mole of ethylene and/or $C_4$-$C_{10}$ α-olefin(s), all the Melt Flow Rate values being measured according to ISO 1133 with a load of 2.16 kg at 230° C., wherein the propylene homopolymers and copolymers of the polypropylene fraction $A^{II}$) have a molecular weight distribution of higher than 10, in terms of Mw/Mn ratio.

2. The compositions of claim 1, wherein the MFR$^I$ value of the polypropylene fraction $A^I$) is obtained without degradation treatments.

3. The compositions of claim 1, wherein the propylene homopolymers and copolymers of the polypropylene fraction $A^I$) are obtained directly from a polymerization process comprising a metallocene-based catalyst.

4. The compositions of claim 1, wherein the propylene homopolymers and copolymers of the polypropylene fraction $A^I$) have a molecular weight distribution of lower than 4, in terms of Mw/Mn ratio.

5. The compositions of claim 1, wherein the filler B) is selected from inorganic fillers, fibers, and combinations thereof.

6. The compositions of claim 1, wherein the filler B) consists essentially of glass fibers, and the polypropylene component A) has the composition b).

7. The compositions of claim 1, wherein the filler B) consists essentially of a mineral filler, and the polypropylene component A) has the composition a).

8. The composition of claim 6 wherein the filler B) is a short glass fiber.

9. Filled polyolefin compositions comprising:
    A) from 20% to 80% by weight of a polypropylene component;
    B) from 20% to 80% by weight of a filler;
    wherein the percentages of A) and B) are referred to the sum of A) and B), and A) is selected from the following compositions:
    a) a polypropylene composition comprising from 20% to 80% by weight of a polypropylene fraction $A^I$) having a Melt Flow Rate (MFR$^I$) value of 500 g/10 min. or more, and from 20% to 80% by weight of a polypropylene fraction $A^{II}$) having a Melt Flow Rate (MFR$^{II}$) value of from 0.1 to 30 g/10 min., the weight percentages of $A^I$) and $A^{II}$) being referred to as the sum of $A^I$) and $A^{II}$); or
    b) a polypropylene composition comprising from 15% to 72% by weight of a polypropylene fraction $A^I$) having a Melt Flow Rate (MFR$^I$) value of 500 g/10 min. or more, from 15% to 70% by weight of a polypropylene fraction A$^{II}$) having a Melt Flow Rate (MFR$^{II}$) value of from 0.1 to 30 g/10 min. and from 0.5% to 15% by weight of a compatibilizer Q), the weight percentages of A$^I$), A$^{II}$) and Q) being referred to as the sum of A$^I$), A$^{II}$) and Q);

said fractions A$^I$) and A$^{II}$) being independently selected from propylene homopolymers and random copolymers of propylene comprising up to 5% by mole of ethylene and/or C$_4$-C$_{10}$ α-olefin(s), all the Melt Flow Rate values being measured according to ISO 1133 with a load of 2.16 kg at 230° C., wherein the polypropylene fraction A$^{II}$) comprises from 30% to 70% by weight of a fraction i) comprising a molecular weight distribution from 4 to 9, in terms of Mw/Mn ratio, and from 30% to 70% by weight of a fraction ii) comprising a molecular weight distribution of higher than 10, in terms of Mw/Mn ratio, the fractions i) and ii) being independently selected from propylene homopolymers and random copolymers of propylene comprising up to 5% by mole of ethylene and/or C$_4$-C$_{10}$ α-olefin(s), and the weight percentages of i) and ii) being referred to as the sum of i) and ii)).

10. The compositions of claim 9, wherein the MFR$^I$ value of the polypropylene fraction A$^I$) is obtained without degradation treatments.

11. The compositions of claim 9, wherein the propylene homopolymers and copolymers of the polypropylene fraction A$^I$) are obtained directly from a polymerization process comprising a metallocene-based catalyst.

12. The compositions of claim 9, wherein the propylene homopolymers and copolymers of the polypropylene fraction A$^I$) have a molecular weight distribution of lower than 4, in terms of Mw/Mn ratio.

13. The compositions of claim 9, wherein the filler B) is selected from inorganic fillers, fibers, and combinations thereof.

14. The compositions of claim 9, wherein the filler B) consists essentially of glass fibers, and the polypropylene component A) has the composition b).

15. The compositions of claim 9, wherein the filler B) consists essentially of a mineral filler, and the polypropylene component A) has the composition a).

16. The composition of claim 14 wherein the filler B) is a short glass fiber.

17. An article produced by injection molding, extrusion, or thermoforming the filled polyolefin composition of claim 1.

18. An article produced by injection molding, extrusion, or thermoforming the filled polyolefin composition of claim 9.

19. A concentrate comprising the filled polyolefin composition of claim 1.

20. A concentrate comprising the filled polyolefin composition of claim 9.

* * * * *